Figures 1, 2:
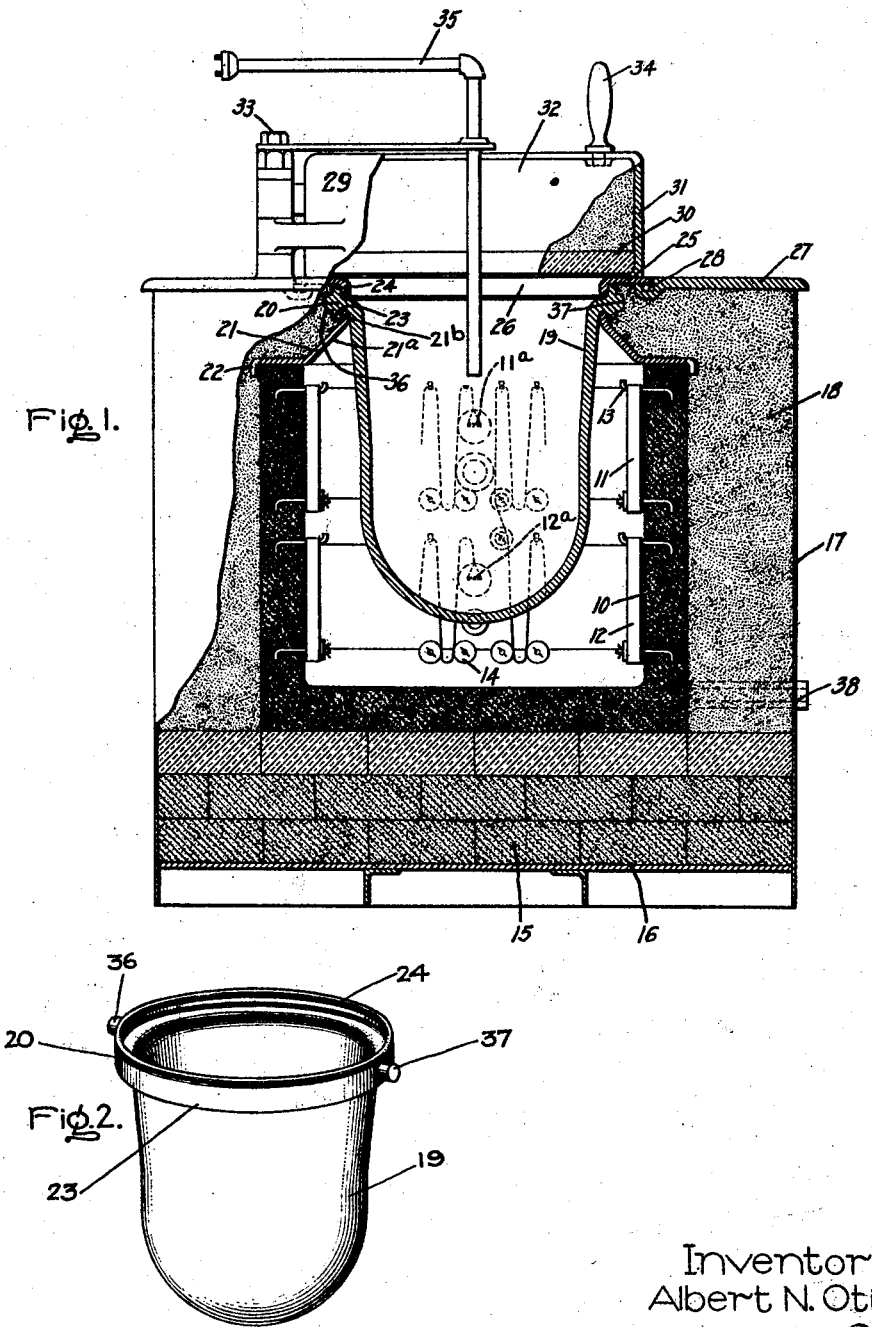

Sept. 16, 1930.                A. N. OTIS                1,776,128
                              MELTING POT
                     Original Filed March 5, 1927

Inventor:
Albert N. Otis,
by (signature)
His Attorney.

Patented Sept. 16, 1930

1,776,128

UNITED STATES PATENT OFFICE

ALBERT N. OTIS, OF SCHENECTADY, NEW YORK, ASSIGNOR TO GENERAL ELECTRIC COMPANY, A CORPORATION OF NEW YORK

MELTING POT

Application filed March 5, 1927, Serial No. 173,158. Renewed February 5, 1930.

My invention relates to melting pots, more particularly to high temperature melting pots such as may be used for holding molten lead or cyanide for the heat treatment of steel, and has for its object the provision of a simple and reliable device of this character.

For a more complete understanding of my invention reference should be had to the accompanying drawing in which Fig. 1 shows an elevation view mainly in section of an electric melting pot embodying my invention and Fig. 2 is a view in perspective of a metallic receptacle.

Referring to the drawing, I have shown my invention in one form in connection with a pot for containing molten lead which is maintained at a comparatively high temperature, approximately 1500° F., to be used in the hardening of tools. The articles to be hardened are immersed in the lead and when thoroughly heated are withdrawn and quenched. The device comprises inner heat refractory walls 10 forming the side and bottom walls of a cylindrical receptacle constituting a heating chamber. The walls may be built up of suitable heat refractory brick. Around the inside of the heating chamber is hung an electric heating resistor shown in upper and lower sections 11 and 12. The resistor consists of a flat ribbon of a suitable resistance heating material, such as a nickel-chromium alloy which is hung in a series of vertical loops on metallic pins 13 secured in the side wall. Spacing insulators 14 are provided for the lower ends of the loops. Suitable terminals 11$^a$ and 12$^a$ for the resistor are brought out through the walls 10. The receptacle formed by the walls 10 rests on several layers of heat refractory bricks 15 which in turn are supported on a metallic base member 16. As shown the bricks 15 are built out around the receptacle into engagement with an enclosing metallic casing 17 which is secured to the base 16. The space between the casing and the side wall 10 is filled with a suitable powdered heat insulating material 18, such as a diatomaceous material.

Inserted in the heating chamber is a metallic receptacle or pot 19 for the material to be melted. This receptacle is provided with a peripheral flange 20 around the top which rests on the upper edge of the annular supporting member 21, resting in turn on the upper edge of the wall 10. The annular member 21, it will be observed, is provided with a horizontal outer annular portion which rests on the upper edge of the wall 10 and is provided with a plurality of downwardly turned fingers 22 around its periphery whereby it is held concentric with the wall. The inner portion of the member 21 is inclined upwardly to form a portion of a cone 21$^a$, the upper opening of which is concentric with the heating chamber and surrounded with a substantially vertical portion or flange 21$^b$ of such size as to fit loosely around the pot 19 which rests on its upper edge. The flange 20 on the body is provided with an outer peripheral overhanging flange 23 which fits over the upper edge of the flange 21$^b$. An upwardly projecting peripheral flange 24 is also provided on the flange 20, and this flange forms a seat for an annular removable member 25. The member 25 is provided with an inner flange 26 which fits inside the flange 24, while the outer edge of the member 25 rests on an annular top plate 27 secured to the casing 17. This annular plate 27 is countersunk to receive the member 25 which is flush with the top surface thereof, and the plate 27 is also provided with an annular groove or recess 28 adjacent the outer periphery of the member 25.

It will be observed that with this construction access is had to the receptacle through the annular member 25. The heat refractory material 18 is packed around the supporting member 21 and the upper edge of the receptacle so as to prevent loss of heat. A suitable cover 29 is provided consisting of a slab 30 of heat refractory material which is mounted in a casing 31. A layer of powdered heat refractory material 32 is provided in the casing to further increase the heat insulation. This cover is pivotally secured to a vertical pin 33 which in turn is secured to the plate 27 near the outer edge thereof. A handle 34 is provided whereby the cover may be slid over the top of the receptacle and thus moved about its pivot to opened and closed positions. A suitable thermocouple 35 may be provided to give an indication of the temperature of the material in the receptacle. An outlet opening 38 is provided in the bottom of the heating chamber to permit the escape of the molten metal in the event of leakage of the receptacle without damage to the heating resistor.

As previously observed this construction permits the upper end of the heating chamber and the metal receptacle to be thoroughly surrounded with the heat insulating material so as to conserve the heat. Another advantage of this construction is that the receptacle may be easily removed. This may be accomplished by first removing the annular ring 25 after which the receptacle may be lifted out. Trunnions 36 and 37 are provided on the receptacle at opposite sides to provide for the atachment of a hoist in lifting it. As the heated articles are removed from the receptacle, the molten metal drips from them on the ring 25 and top plate 27 from which it may be scraped back into the receptacle. Such of the drippings as may find their way into the crevice at the junction of the ring 25 and the plate 27 are collected by the recess 28. This recess in conjunction with the ring 25 and plate 27 effectually prevents the entrance of the metal drippings and other foreign materials into the insulating material 18. Such materials if allowed to mix with the insulating material would decrease its heat insulating value. Besides facilitating the removal of the metal receptacle, the provision of the two parts at the top, i. e. the ring 25 and the plate 27, breaks up the thermal path from the metal receptacle. The joint between the two members offers a path of high thermal resistance which greatly reduces the loss of heat by conduction through these parts.

Another feature of advantage lies in the conical portion 21$^a$ of the supporting member 21. This inner portion of the supporting member is often heated to a much higher temperature than the outer horizontal portion and as a result its expansion is much greater than the expansion of the outer portion. This is particularly true when the pot is being initially heated. With this conical shape the upper portion 21$^a$ is free to expand and contract independently of the outer portion so that no strains are set up. These strains if not compensated for would cause buckling or rupture of the supporting member. This conical shape also provides for the heating of the upper end of the metal receptacle while also providing for a deep layer of powdered insulating material 18 around the top of the heating chamber. The provision of the fingers 22 around the periphery for centering the supporting member on the wall 10 also provides for freedom of expansion and contraction due to changes in temperature as compared, for example, with the usual continuous flange around the outer periphery. The overhanging flange 23 on the receptacle makes it impossible for any molten metal which might be spilled to run down the outside of the pot.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention the scope of which is set forth in the annexed claims.

What I claim as new and desire to secure by Letters Patent of the United States, is:—

1. A melting pot comprising a heat refractory wall forming an open top chamber, heating means for said chamber, an annular top member for said chamber provided with an opening, said annular member being inclined toward the center, a receptacle inserted in said opening provided with a supporting flange resting on said member, and an annular member resting on said flange.

2. A melting pot comprising a heat refractory wall forming an open top chamber, heating means for said chamber, a supporting member on said wall provided with a central aperture and an upstanding edge surrounding said aperture, a receptacle inserted in said aperture provided with a supporting flange resting on and overhanging said upstanding edge, and an annular member provided with a flange on its inner periphery fitting in said receptacle.

3. A melting pot comprising a heat refractory wall forming an open top chamber, heating means in said chamber, a top supporting member on said chamber provided with an inclined central wall terminating in an opening, and a receptacle inserted in said opening provided with a supporting flange resting on said member.

4. A melting pot comprising a heat refractory wall forming an open top chamber, heating means for said chamber, an annular top member for said chamber having an upwardly extending conical central portion, and a receptacle inserted in said chamber provided with a supporting flange resting on said member.

5. A melting pot comprising a heat refractory wall forming an open top chamber, heating means for said chamber, an annular supporting member on said wall having an upwardly extending conical central portion, a receptacle inserted in said member provided with a supporting flange resting on and overhanging the upper edge of said supporting member, and heat insulating material surrounding said supporting member and the upper end of said receptacle.

6. A melting pot for heat treating metallic articles, comprising a heat refractory wall forming an open top heating chamber, heating means in said chamber, a receptacle for the molten material in said chamber, a top plate for said wall provided with a central opening through which the receptacle may be removed, an annular member fitting in said opening, and a flange on the inner periphery of said annular member fitting in the upper end of said receptacle.

7. A metal pot comprising a heat refractory wall forming an open top heating chamber, heating means in said chamber, a supporting member on said wall provided with an opening concentric with said chamber, a receptacle in said chamber provided with a supporting flange resting on said member, a casing around said wall in spaced relation thereto, heat refractory material between said wall and said casing surrounding the top of said receptacle, a top member on said casing provided with an opening through which said receptacle may be removed, an annular member fitting in said opening, and a flange on the inner periphery of said annular member fitting in the upper end of said receptacle.

8. A melting pot comprising a heat refractory wall forming an open top chamber, heating means around the interior of said wall, a metallic member on said wall provided with an opening concentric with said chamber, a receptacle in said opening provided with a supporting flange at the top resting on said member, a casing around said wall in spaced relation thereto, heat refractory material between said wall and said casing surrounding the top of said receptacle, a top member on said casing provided with a central opening through which said receptacle may be removed, an annular member fitting in said opening, and a flange on the inner periphery of said annular member fitting in the upper end of said receptacle.

9. A melting pot comprising heat refractory walls forming an open top chamber, heating means in said chamber, a supporting member in said wall provided with a central aperture and an upstanding edge surrounding said aperture, a receptacle inserted in said aperture provided with a supporting flange resting on and overhanging said upstanding edge, a top plate provided with an opening through which said receptacle is removable, and an annular member fitting in said opening provided with a flange on its inner periphery fitting in said receptacle, said top plate being provided with a recess in its inner periphery below the outer periphery of said annular member.

10. A melting pot for heat treating metallic articles comprising a heat refractory wall forming an open top heating chamber, heating means in said chamber, an annular supporting member on said wall provided with an upwardly extending conical central portion, a receptacle set in said aperture, a casing surrounding said wall, heat refractory material between said wall and said casing surrounding the top of said receptacle, a top member provided with a central opening through which said receptacle may be removed, an annular member fitting in said opening, a flange on said annular member fitting in the upper end of said receptacle, said top member being provided with a recess around said annular member.

11. A melting pot or the like comprising a wall forming an open top chamber, heating means for said chamber, a member having an outer portion supported by said wall and an inner portion extending at an angle with said outer portion to compensate for strains set up by unequal thermal expansion and contraction in said member, said inner portion terminating in an opening, and a receptacle extending through said opening into said chamber and supported by said inclined inner portion.

12. A melting pot or the like comprising a wall forming an open top chamber, heating means for said chamber, an annular conical member at the upper end of said chamber having its outer portion supported by said wall, and a receptacle extending through said conical member into said chamber arranged to be supported by said conical member.

13. A melting pot or the like comprising a wall forming an open top heating chamber, heating means for said chamber, a member having an outer portion supported by said wall and an inner portion extending at an angle to said outer portion to compensate for strains set up by unequal expansion and contraction in said member, said inner portion terminating in an opening, a receptacle extending through said opening into said chamber, and heat insulating material around said inner portion.

14. A melting pot or the like comprising a wall forming an open top chamber, a receptacle in said chamber, an annular member at the top of said chamber having an upwardly extending cone shaped portion surrounding said receptacle, heat insulating material around said cone shaped portion, and heating means between said receptacle and said wall.

In witness whereof, I have hereunto set my hand this 3d day of March, 1927.

ALBERT N. OTIS.